United States Patent Office 3,635,919
Patented Jan. 18, 1972

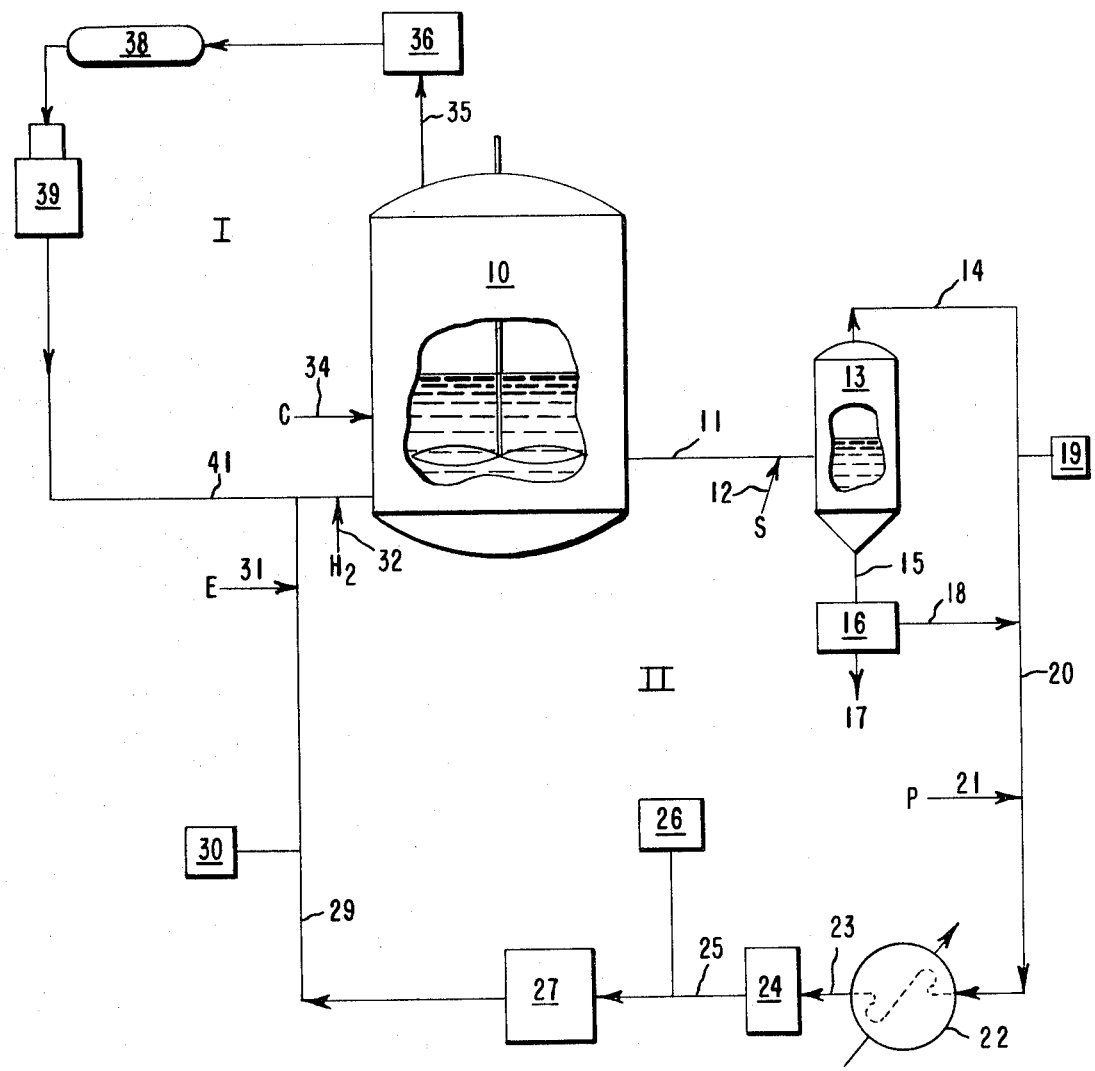

3,635,919
PREPARATION OF ETHYLENE/PROPYLENE COPOLYMER
Edward Peter Goffinet, Jr., Wilmington, Del., assignor to E. I. du Pont de Nemours and Company, Wilmington, Del.
Filed July 30, 1969, Ser. No. 846,006
Int. Cl. C08f 15/04
U.S. Cl. 260—80.78    5 Claims

ABSTRACT OF THE DISCLOSURE

Process for producing an ethylene/propylene copolymer having a predetermined composition on a continuous basis by recycling reactants of the reaction mixture in two separate streams, a first stream formed from the vapor phase of the reaction mixture and comprising largely monomers; and a second stream comprising liquid phase of the reaction mixture free from polymer product, analyzing the second stream for monomer concentrations and regulating the flow of fresh monomers to the reactor to maintain constant monomer concentrations in the liquid phase; compressing, cooling and purifying the first stream and recycling the cooled monomers therein to the reactor.

BACKGROUND OF THE INVENTION

This invention concerns a continuous process for producing ethylene/propylene copolymers having predetermined physical and chemical characteristics.

Etheylene/propylene copolymers and particularly ethylene/propylene/diene terpolymers have achieved substantial commercial success as elastomers. They are used in a wide number of applications requiring rubber-like properties while resistance to degradation due to oxidation is desired. One of the problems facing the art, however has been the production of such elastomeric materials having uniform composition and properties.

It is well known to control the molecular weight of olefin polymers such as polyethylene and polypropylene by conducting the polymerization in the presence of controlled amounts of hydrogen; and attempts have been made to regulate such polymerizations by analyzing the molecular weight of the polymer product, or determining the hydrogen content of effluent vapor streams and thereafter controlling the partial pressure of hydrogen in the reactor within a predetermined range. Another scheme has involved analyzing the feed stream to a polymerization reactor for hydrogen content and controlling the amount of hydrogen in the reactor accordingly. Such schemes can be effective with simple polymerizations involving a single monomer or liquid full reactors; but the problem of effectively controlling polymer molecular weight and composition is considerably more complicated in a two-phase reactor, especially when two or more monomers differing widely in reactivity are involved. With such polymerizations it is not sufficient merely to control hydrogen concentration in the reactor. It is also necessary to take into account the diverse reactivities of the monomers under the particular conditions in the polymerization reactor, monomer concentrations in the reaction liquid and their volatility. If hydrogen is utilized to control molecular weight of such a polymer an additional variable is introduced whcih must be taken into account in combination with the others.

In the case of polymers prepared from monomers having widely different reactivities (e.g., ethylene and propylene) the proportions of the different monomer units in the polymer product are quite different from the proportions of these monomers in the reaction mass and analysis of the polymer product does not provide accurate information of the reaction mass composition. Moreover, the necessary time-delay in obtaining an analysis of the polymer product prevents the analysis from providing information on current conditions in the reactor; and control of a polymerization by such analysis is ineffective and impractical on a commercial basis. Additionally, it is now known that analysis of the vapor phase in a two phase reactor and maintenance of constant partial pressures of the gases in the vapor phase is not an effective or a commercially practical method for controlling the composition of the polymer product, one reason being that residence time in the reactor is almost always too short to permit equilibrium to be attained; partial pressures therefore do not represent the reaction conditions which determine polymer composition or molecular weight accurately. Inefficient mass transfer of the reaction ingredients distorts the normal thermodynamic relationships which might be expected to be attained under equilibrium conditions. Past procedures for controlling these complicated polymerization reactions have been largely ineffective because of the difficulty in analyzing a liquid stream containing dissolved polymer, and more importantly because of the failure to recognize all of the variables involved in controlling the polymerization reaction and monomer proportions in the polymer produced. There has been a need for a simple and effective process for controlling an ethylene/propylene polymerization reaction to produce dipolymer and terpolymers having predetermined chemical compositions and molecular weights.

SUMMARY OF THE INVENTION

In accordance with this invention ethylene and propylene are polymerized continuously, with or without additional monomers, in liquid phase to produce a polymer having predetermined monomer proportions. The reaction is preferably carried out in a two-phase reactor having two recycle loops. The first loop (I) withdraws from the reactor a vapor phase steam containing monomers which, following compression, cooling and purification, are recycled to the reactor. During purification in the loop I stream, contaminants such as ethane, methane and nitrogen gases are removed. Loop I serves to maintain the reaction vessel at a predetermined operating temperature by introducing cool monomers to the reactor, for example, liquified monomers which evaporate within the reactor. The second loop (II) is the polymer isolation loop in which a stream of liquid reaction material containing polymer product is withdrawn from the reactor and analyzed for ethylene and propylene after the polymer is removed and before unreacted monomers contained therein are returned to the reactor. The addition of fresh ethylene and propylene to the reactor is regulated in accordance with the analysis to maintain the concentrations of these monomers in the liquid phase of the reactor constant or at a predetermined concentration calculated to produce the desired polymer. The analysis in some circumstances may suggest changes in other reaction mass conditions such as catalyst flow, temperature, etc.

A particular advantage of the present invention lies in the accuracy with which the ultimate structure and properties of the polymer product can be controlled. Thus whereas prior art control schemes have required analysis of the whole liquid reaction mixture containing polymer product, or vapor phase in the reactor or a gross effluent or feed stream, the present invention permits effective control of reactor conditions by analysis of samples which do not require removal of polymer, catalyst residues and other contaminants before the analysis can proceed. This is achieved by conducting the recycle of the liquid phase monomers and solvent to provide sampling points at which polymer and other contaminants are not present.

The above advantages are attained by means of two recycle loops which permit monomers (and hydrogen when used) to be recycled in loop I for temperature control and continuous removal of inert gases from reaction mixture. In loop II containing liquid phase effluent from the reactor, monomers (and hydrogen) are separated by volatilization with heat as, for example, by treatment with hot water or steam which simultaneously terminates polymerization by killing the catalyst. Prompt termination of the polymerization as soon as the liquid phase effluent leaves the reactor is important since otherwise subsequent analysis will not provide an accurate indication of reactor conditions. The vapors thus evolved can be analyzed by any convenient means to give an accurate and timely indication of the reaction conditions in the reactor which affect the composition and properties of the polymer product.

DESCRIPTION OF PREFERRED EMBODIMENTS

Following flashing of the monomers, the remaining solution of polymer, catalyst residues and water is treated to isolate polymer by conventional procedures, and solvent thus released is combined with the previously flashed monomer vapors for drying and additional analysis before returning to the reactor. In accordance with a preferred embodiment of this invention the combined solvent and flashed monomer streams after removal of gross water are monitored for ethylene, propylene and hydrogen instead of monitoring the flashed monomer vapors. Apart from the advantage of handling a solution of the monomers, rather than vapor, this procedure also eliminates several variables inherent in the earlier analysis. The absence of gross water is, of course, of considerable assistance in expediting analysis besides eliminating the necessity for correcting the results for this factor. Also the solvent to be returned to the reactor is already present and the amount of solvent to be recycled and the concentrations of monomers and hydrogen therein need not be calculated. Many variables with their attendant errors and inherent tolerances are thus automatically eliminated.

Analysis for hydrogen content of the polymer isolation loop stream is especially advantageous because the hydrogen concentration of this stream is most representative of the conditions in the reactor, particularly as compared to the hydrogen content of the feed stream to the reactor which can contain as much as 1000 times as much hydrogen. The accuracy of the analysis for ethylene is similarly benefited.

Loop I provides a very efficient means for cooling and purifying the reaction mixture whereas loop II is uniquely suited for monitoring and related control of the other reaction conditions.

BRIEF DESCRIPTION OF THE DRAWING

The figure of the attached drawing illustrates a typical application of the present invention to an ethylene/propylene/diene (EPDM) polymerization process. All parts and proportions referred to herein are by weight unless otherwise indicated.

All feed quantities are based on 100 parts of copolymer product. In this particular embodiment ethylene, propylene and 1,4-hexadiene are polymerized continuously in solution in tetrachloroethylene at 50° C. and 9 kilograms per square centimeter (gauge) with a residence time of about 38 minutes. A vapor phase and a liquid phase exist in the reactor, the mole ratio propylene/ethylene in liquid phase being about 14.4/1; the ratio of propylene/hexadiene being 13/1 and the mole fraction of propylene in the liquid phase (excluding polymer) being about 0.365.

A coordination catalyst C formed by premixing $VOCl_3$ (0.31 part) with diisobutylaluminum chloride (0.96 part) is continuously introduced into reactor 10 by line 34. Hydrogen is used to control polymer molecular weight.

From reactor 10 in which polymerization takes place and which contains a liquid and a vapor phase, 2920 parts liquid polymerization reaction product mixture containing 3.3 percent ethylene/propylene/1,4-hexadiene terpolymer begins its passage through polymer isolation loop II (11–31) moving initially as reactor effluent stream 11 to flasher 13 after being treated en route with steam S at 12. Sufficient steam is added to stream 11 to inactivate the catalyst, thereby terminating polymerization almost immediately after the stream leaves the reactor, and to volatilize ethylene, propylene and hydrogen which are flashed off by line 14. The flasher is operated at about 100° C. and one kilogram per square centimeter (gauge). A liquid stream 15 containing polymer, tetrachloroethylene solvent, catalyst residues, water and 1,4-hexadiene is withdrawn from the bottom of the flasher and sent to polymer isolation unit 16 from which polymer product 17 is recovered. Solvent (2428 parts) thus removed and recycle 1,4-hexadiene flow as stream 18 to join overhead monomer vapor stream 14 and thereby form monomer solution stream 20 to which is added fresh hexadiene (3.9 parts) by means of a line not depicted. It has been found that analysis of monomer vapor stream 14 at sampling point 19 provides an accurate means for ascertaining the state of the polymerization reaction and controlling the ultimate polymer structure and properties. Analysis for ethylene, propylene and hydrogen concentrations by conventional vapor phase chromatographic analysis is very satisfactory. Analysis of vapor stream 14 shows an extremely low hydrogen concentration of about 0.000014 weight percent but such analysis nevertheless permits accurate monitoring of reactor conditions and control of polymer chain growth. Fresh propylene P (46.4 parts) and hexadiene are conveniently dissolved in stream 20 at 21, although it can be added at another point downstream if desired, and the solution is cooled in cooler 22 to remove heat of solution and condense gross (separate phase) water. The water is removed by decantation in tank 24. The resulting dried solution in stream 25 containing small amounts of ethylene and hydrogen is passed to molecular sieve drier 27 for removal of residual water and cooled in a cooler (not shown, located just beyond drier 27) before being returned to the reactor by stream 29. Fresh (make-up) ethylene (54.4 parts) and fresh hydrogen ( 0.009 part) are added at 31 and 32, respectively. Alternatively, all make-up (fresh) monomers and hydrogen can be added to loop I or to the reactor or at any point in loop II following the analysis point.

According to a specific embodiment of this invention the solution of stream 29 is analyzed for ethylene, propylene and hydrogen content at 30 as a check on any previous analysis. Hexadiene is also analyzed at this point. The check analyses at 30 acts to avoid excessive upsets in the over-all polymerization system due to various unforeseen circumstances including inadvertent contamination of reactants or equipment, failure of equipment to function properly and other operational difficulties.

According to a preferred embodiment of this invention analysis of the loop II recycle stream is performed by sampling solution stream 25 at sampling point 26 (rather than analyzing monomer vapor stream 14). Stream 25 being a solution and free of gross water permits more convenient monitoring of monomers and hydrogen with fewer corrections being necessary and, therefore, greater likelihood of reliable results. Moreover, stream 25 is practically as close in time to the reactor (about 5–12 minutes) as stream 14 and therefore gives a more reliable indication of current reactor conditions than, for example, an analysis of stream 29. The latter, although it can provide the same basic information is considerably less desirable because of time-lag of about 20 minutes (mostly in drier 27) and is less effective for correcting operational upsets before undue harm occurs. Drier 27 is a molecular sieve drier which practically completely dries the second stream and which must equilibrate with each change in composition of stream 25; the time-lag between streams 25 and 29 can be considerable. Stream analysis should be as close in time as practicable to the reactor 10 and it is an important feature of this invention that analysis for ethylene, propylene and hydrogen (if present) is performed on a sample within about 25 minutes (preferably within 10 minutes) after the sample has left the reactor. Analysis at 26 appears to be the best compromise among time-lag, convenience of analysis and use of the analytical results.

Loop I, otherwise referred to as the monomer cooling loop, performs the very important function of maintaining the reactor at a desired reaction temperature. This is accomplished by volatilization of monomers ethylene and propylene in the two phase reactor 10 and recycle of the vapors (about 480 parts) along with hydrogen through cooling loop I (35–41) in which the vapors are compressed by compressor 36 and cooled in condenser 38 before entering purge pot 39 where various inert gaseous contaminants such as nitrogen, methane and ethane are removed. The purged cooled monomers and hydrogen are then passed to reactor 10 by line 41 as needed to control reactor temperature.

Ethylene/propylene dipolymer is made by the above procedure by simply omitting 1,4-hexadiene.

Typical operation of the process as above described yields a rubber-like tripolymer containing about 54 percent ethylene units, 42.5% propylene units and 3.5% 1,4-hexadiene units; the Mooney viscosity (ML 1+4/121° C.) is about 75.

The successful operation of this invention requires the use of volatile monomers, such as ethylene and propylene, which are at least 70% vaporized, preferably at least 90% vaporized under the conditions in flasher 13. Solvents such as tetrachloroethylene and n-hexane and monomers such as 1,4-hexadiene are insufficiently volatile under these conditions to be flashed.

Monitoring for ethylene, propylene and hydrogen contents of a stream in accordance with this invention is conveniently conducted using conventional vapor phase chromatographic techniques but other methods of analysis can also be used. Accuracy and speed are vital if the monitoring is to provide a current indication of polymer properties and structure and permit a uniform product to be produced.

Ethylene and propylene can be polymerized alone to prepare a diploymer according to this process or can be copolymerized with one or more additional monomers to prepare polymers containing three or more monomeric units. Exemplary additional monomers are non-conjugated dienes containing only one polymerizable double bond, that is, only one double bond which polymerizes to form part of the backbone of the polymer to any significant extent. Representative of such dienes are $C_6$–$C_{22}$ non-conjugated aliphatic dienes such as 1,4-hexadiene, 1,4-heptadiene, 1,5-heptadiene, 4,5-dimethyl-1,4-hexadiene, 6-methyl - 1,5 - heptadiene, 7-methyl-1,6-octadiene, 5-methyl-1,4-hexadiene, 1,5-octadiene, 11-ethyl-1,11-tridecadiene, etc. Other useful non-conjugated dienes include cyclopentadiene, dicyclopentadiene, 5-alkenyl-2-norbornenes such as 5 - (2' - butenyl)-2-norbornene; 5-alkylidene-2-nobornenes such as 5-ethylidene-2-norbornene, and 5-methylene-2-norbornene, 2-alkyl-2,5-norbornadienes such as 2-ethyl-2,5-norbornadiene; 1,5-cyclooctadiene and the like.

Preferred elastomeric polymers are EPDM polymers such as ethylene/propylene/diene terpolymers in which the diene is one of the dienes referred to above. A particularly preferred terpolymer is ethylene/propylene/1,4-hexadiene terpolymer.

Representative EPDM polymers useful in this invention and procedures for making them are disclosed in U.S. Pats. 2,933,480, 3,000,866, 3,063,973, 3,093,620 and 3,093,621. Polymers containing non-conjugated diene units should contain 20–75% ethylene units, 80–25% propylene units and 0.5–5% diene units, there being enough diene units to provide sulfur curability.

Any convenient liquid which is a solvent for the reactants and the polymer product can be used in this invention but tetrachloroethylene is preferred among the various halogenated solvents which are known to be useful for preparing ethylene/propylene copolymers and n-hexane is preferred among the various hydrocarbons known to be similarly useful. The invention is also useful in slurry processes, carried out, for example, in an excess of propylene in which the polymer is sparingly soluble and without additional solvents.

I claim:

1. In the process for continuously polymerizing ethylene and propylene in a liquid/vapor phase reaction system in the presence of a coordination catalyst to produce an elastomer having a predetermined composition, the improvement consisting essentially of:
   (a) controlling the reaction mixture temperature by withdrawing a first stream from the vapor phase of the reaction mixture and compressing, cooling and purging it of contaminants before returning it to the reaction mixture at a controlled rate,
   (b) withdrawing from the liquid phase of the reaction mixture a second stream containing polymer, catalyst residue, unreacted monomers and solvent,
   (c) inactivating the catalyst, volatilizing ethylene and propylene and separating polymer from the second stream and recycling the monomers and solvent in a dry state to the reaction mixture, and
   (d) monitoring the amount of ethylene and propylene in the second stream following separation of polymer therefrom and regulating the flow of fresh ethylene and propylene to the reaction mixture to maintain their concentrations at a desired level in the liquid phase.

2. The process of claim 1 in which ethylene, propylene and a non-conjugated diene having only one polymerizable double bond are polymerized in the presence of hydrogen, and the first stream carries hydrogen in an amount up to 1000 times the weight of hydrogen in the second stream.

3. The process of claim 2 in which the diene is 1,4-hexadiene.

4. The process of claim 2 in which a sample of the second stream is also monitored for hydrogen content within about 25 minutes of leaving the reactor.

5. The process of claim 4 in which ethylene and propylene volatilized from the second stream are continuously dissolved in the solvent remaining after polymer is separated therefrom and the resulting solution is monitored for ethylene, propylene and hydrogen content prior to return to the reactor.

References Cited
UNITED STATES PATENTS

| | | | |
|---|---|---|---|
| 3,324,090 | 6/1967 | Ross et al. | 260—80.78 |
| 3,506,634 | 4/1970 | Di Drusco et al. | 260—88.2 |
| 3,506,640 | 4/1970 | Reid et al. | 260—94.9 |

JOSEPH L. SCHOFER, Primary Examiner

R. A. GAITHER, Assistant Examiner

U.S. Cl. X.R.

260—88.2 R, 94.9 P